A. R. THOMSON.
ANTISKIDDING DEVICE.
APPLICATION FILED MAY 4, 1917.
1,360,599. Patented Nov. 30, 1920.
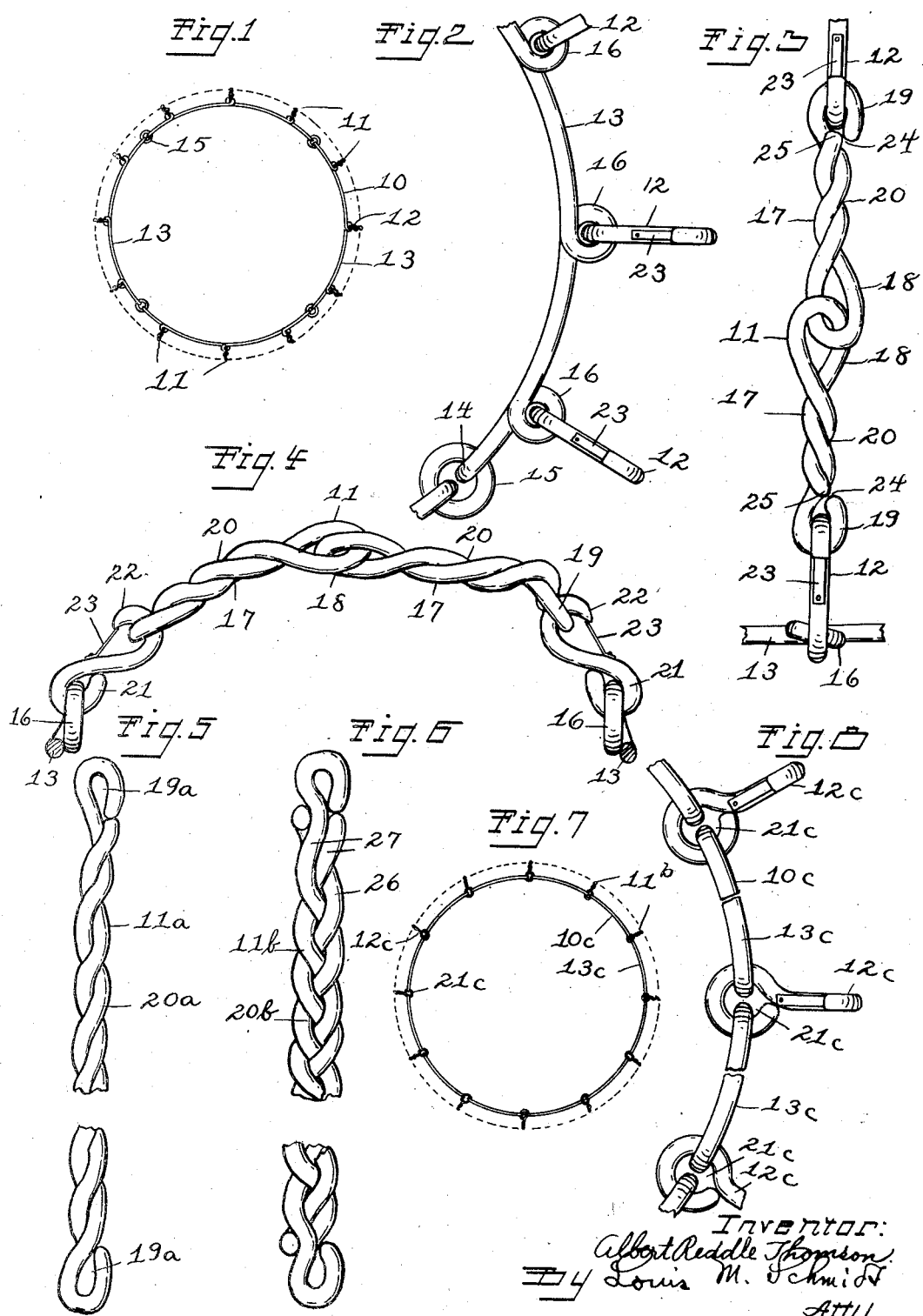

UNITED STATES PATENT OFFICE.

ALBERT REDDLE THOMSON, OF PLANTSVILLE, CONNECTICUT, ASSIGNOR OF ONE-HALF TO NAPOLEON RINFRETT, OF SOUTHINGTON, CONNECTICUT.

ANTISKIDDING DEVICE.

1,360,599.  Specification of Letters Patent.  Patented Nov. 30, 1920.

Application filed May 4, 1917. Serial No. 166,453.

*To all whom it may concern:*

Be it known that I, ALBERT REDDLE THOMSON, a citizen of the United States, residing at Plantsville, in the county of Hartford and State of Connecticut, have invented certain new and useful Improvements in Antiskidding Devices, of which the following is a specification.

My invention relates to improvements in anti-skidding devices, and the object of my improvement is to produce an anti-skidding device that is serviceable and convenient for use with automobile wheel and tire structures adapted for heavy service, such as auto-trucks, involving the use of heavy materials, and based on the type of anti-skidding device shown and described in the application of Napoleon Rinfrett, the patent for which was issued to said Rinfrett and myself, March 6, 1917, No. 1,217,999.

In the accompanying drawing:—

Figure 1 is a side elevation of my improved anti-skidding device.

Fig. 2 is a side elevation on an enlarged scale of part of the same.

Fig. 3 is a plan view of one of the bridge members and adjacent parts, the said parts being opened out full length.

Fig. 4 is a side elevation of the same.

Fig. 5 is a plan view, corresponding to Fig. 3, showing a modification of the tread member.

Fig. 6 is a similar view of another modification.

Fig. 7 is a side elevation, on the same scale as Fig. 1, of a modification of the general structure.

Fig. 8 is a side elevation on the same scale as Fig. 2 of a portion of the modified structure shown in Fig. 7.

My improved anti-skidding device comprises a pair of circular side frame structures 10 for being positioned one on each side of the wheel, a plurality of tread structures 11, and a set of connecting devices 12 in the form of snap-hooks for connecting the tread structures 11 with the side frames 10, said connecting devices 12 being permanently incorporated with the side frame structures 10, and permitting of disconnecting the said tread structures 11.

The side frame structures 10 are formed of a plurality of individual sections 13, interconnected in series at the ends by means of eyes 14 that are connected by means of a ring 15 interposed between the adjacent eyes 14, and having along the circumference a plurality of outwardly directed loops 16 for connection with the tread structures.

The tread structures 11 are in the form of wire structures for extending over the tread portion of the tire and are formed generally after the manner of the wire structures shown and described in the patent mentioned, and are composed of a pair of similar tread members 17, the outer ends being connected by means of inter-engaged loops 18, the inner ends having inner hooks 19 for engaging with the connecting devices 12, the shank portion 20 intermediate the said loops 18 and hooks 19 being formed by twisting together the adjacent opposed portions of the wire.

The connecting devices 12 comprise a closed eye 21 at one end that is engaged with the loop 16 of the side frame, and at the other end has the hook 22, the gap of which is bridged by the spring device 23, for being separably connected with the hook 19 of the tread structure 11.

Considering details of construction more particularly, it is noted that the individual members 17 are formed of a single piece of wire, bent back upon itself somewhat to one side of the middle to form the outer loop 18 at the middle of the complete tread structure, the arms of the loop being brought together and twisted to form the shank 20. The ends of the wire are of unequal length, the longer end being bent around in hook-like form so as to form the inner hook 19, which hook 19 is partially open as shown at 24, and the tip end 25 of the shorter end is positioned adjacent the open portion or mouth 24 of the said hook 19, suitably to form a closure, so as to prevent disconnecting of the hook portion 22 of the snap-hook 12 when engaged therewith.

The snap-hooks 12 are threaded on the wire of the side frames to the positions of the loops 16 and retained in such position as the loops are formed, whereby they are permanently connected to the said side frames.

I am aware that snap-hooks have been used for connecting structures with side members of anti-skidding devices, but believe that the permanent connection of snap-hooks in side frames of wire as described to be new and I find the same to be of especial convenience in facilitating the interchange of tread structures of the type described having particularly in mind the adaptability of the same for heavy duty.

In the modification shown in Fig. 5 the interengaged loops 18 at the middle are omitted, the closed hooks 19ª at the ends being connected by shank portions 20ª that extend continuously over the tread portion of the tire.

In the modification shown in Fig. 6 the tread member 11ᵇ differs from that shown in Fig. 5 in having an additional wire 26 twisted in with the two arms 27 of the opposed wires to reinforce the twisted shank portion 20ᵇ.

In the modification shown in Figs. 7 and 8 the side frames 10ᶜ are made up of short length sections 13ᶜ of the right length to interconnect the adjacent tread members 11ᶜ, and in lieu of providing a separate ring 15 for inter-connecting the adjacent sections 13ᶜ I utilize for this purpose the eyes 21ᶜ of the snap-hooks 12ᶜ, thus providing a relatively compact structure.

By providing snap-hooks on the side frames as described the tread members may be readily changed individually as may be necessary.

The tread members shown in Fig. 7 may be of any approved form, though the form of the tread members 11ᵇ shown in Fig. 6 would be the best adapted for heavy duty of any shown.

Considering further the construction shown in Fig. 7, the same comprises side frame structures at the sides that are endless and made up of parts that are permanently connected together. For the purpose of placing the device in position on a wheel I disconnect a few of the individual tread members by means of the snap-hooks and reconnect the same after the wheel has been brought into position between the side frames.

I claim as my invention:

A pair of side frame structures for antiskidding devices suitable for being cross-connected by tread members that extend over the periphery of a tire, each of the said side frame structures being composed of a series of individual sections of wire of appreciable length that have the opposed ends of adjacent sections connected together, and the means for connecting the said opposed ends comprising a snap-hook structure that is incorporated in the side frame structure, and the said snap-hook structure comprising in each case a snap-hook proper that extends radially from the side frame structure suitably to separably receive one of the said tread members.

ALBERT REDDLE THOMSON.

Witnesses:
VIVIAN STARK,
NAPOLEON RINFRETT.